United States Patent [19]

Johnson

[11] Patent Number: 4,925,409
[45] Date of Patent: May 15, 1990

[54] TORSIONAL DAMPER FOR MARINE DRIVE UNIT

[75] Inventor: Harold C. Johnson, Oshkosh, Wis.

[73] Assignee: Brunswick Corporation, Skokie, Ill.

[21] Appl. No.: 243,675

[22] Filed: Sep. 13, 1988

[51] Int. Cl.$^5$ .............................................. B63H 21/28
[52] U.S. Cl. ...................................... 440/52; 188/290;
440/83; 440/75; 440/900; 192/58 B
[58] Field of Search ....................... 440/75, 83, 52, 900;
464/24; 60/364; 192/58 B; 188/290, 296

[56] References Cited

U.S. PATENT DOCUMENTS

| | | | |
|---|---|---|---|
| 3,390,748 | 7/1968 | Hein et al. | 192/58 B |
| 3,907,079 | 9/1975 | Chapman | 192/58 B |
| 4,503,952 | 3/1985 | Hesse | 192/58 B |
| 4,782,930 | 11/1988 | Kuroiwa et al. | 192/58 B |

FOREIGN PATENT DOCUMENTS 1357106  2/1971  United Kingdom .............. 192/58 B

*Primary Examiner*—Joseph F. Peters, Jr.
*Assistant Examiner*—Edwin L. Swinehart
*Attorney, Agent, or Firm*—Andrus, Sceales, Starke & Sawall

[57] ABSTRACT

A torsional damper for interconnecting the engine crankshaft and the driveshaft in a marine drive unit utilizes a high viscosity fluid as the fluid drive medium and also to cushion the transmission from the crankshaft to the driveshaft of torsional vibrations created by peak engine firing impulses. The damper includes two sets of interleaved and overlapping damper plates disposed within a housing. One set of plates is attached to the crankshaft input for relative rotation therewith and the other set is attached to the driveshaft and driven by the high shear resistance of the transmission fluid. The extremely high viscosity fluid reduces slip between the plate sets and thus between the crankshaft and driveshaft to a minimum, yet effectively precludes the transmission of torsional vibrations which significantly reduce drive train life. The damper construction of the present invention may be adapted for use in both outboard motors and stern drives.

11 Claims, 2 Drawing Sheets

TORSIONAL DAMPER FOR MARINE DRIVE UNIT

BACKGROUND OF THE INVENTION

The present invention relates to a torsional damper for absorbing peak engine firing impulses normally transmitted from the engine to the drive train in a marine drive unit. More particularly, the invention relates to a torsional damper which utilizes a highly viscous, high shear fluid to provide a low slip fluid transmission of torque between the engine crankshaft and the driveshaft while absorbing peak torsional vibrations.

As is well known in the art, the use of an internal combustion engine to provide motive power results in torsional vibrations which are transmitted to the engine drive train as a result of the sequential engine firing impulses. The peak engine firing impulses induce very high stresses on components of the drive train resulting, in many cases, in reduced component life. In a marine drive unit, such as an outboard motor, peak engine firing impulses are known to induce particularly high stresses on the gears in the lower gear case which translate rotation of the vertically disposed driveshaft to rotation of the horizontally disposed propeller shaft. High vibrational stresses are also known to be imposed on the elastomer member used to mount the propeller hub on the propeller shaft.

Two principal means of reducing the transmission of torsional impulse stresses from an engine to the drive train in a marine drive unit are to utilize a heavy engine flywheel or to provide a rubber or other elastomer coupling between the engine crankshaft and the driveshaft to the drive unit. The added weight created by a heavy flywheel is particularly unattractive in a marine application and, in the case of an outboard motor in particular, the typical location of the flywheel on top of the engine makes it unsuitable for absorbing torsional vibrations in any event. In a stern drive marine engine, the use of a heavy cast iron flywheel to absorb torsional vibrations results in both a weight and space penalty. A stern drive may utilize a rubber coupling to supplement the vibration damping provided by the engine flywheel. Because of the relatively harsh environment in which marine drives are often operated, deterioration of rubber or elastomer couplings detracts substantially from their utility for use as torsional vibration dampers in both outboard and stern drive application.

Nevertheless, the damping of torsional vibrations resulting from peak engine firing impulses is needed to maintain reasonable life in the gear set used for the transmission of power to the propeller. With respect to the propeller mounting itself, an elastomer mount with greater stiffness may be used to better absorb high torsional vibrations. However, a stiffer rubber or elastomer propeller mounting exposes the propeller to potentially greater stresses imposed by external forces acting directly on the propeller.

One type of viscous fluid coupling, used as a limited slip differential between axles in four wheel drive vehicles, utilizes a closely spaced stack of plates which are alternatively attached to the relatively rotatable components of the differential and between which a viscous fluid provides the driving connection with a limited amount of slip. This application, however, is not concerned with the damping of torsional vibrations and the relatively large amount of slip provided by this coupling would be unsuitable in a marine drive unit application.

Thus, there continues to be a need in marine drive units, both outboard motors and stern drives, for an improved means of absorbing torsional vibrations and eliminating their transmission to the drive train of the unit, thereby enhancing drive train durability and life. Any torsional vibration damper should be resistant to deterioration as a result of the environment in which it must operate and, preferably, should provide a weight and space saving over present devices utilizing an engine flywheel for damping. The device must also be capable of uniform and consistent operation over a wide range of temperatures typically encountered in the operation of a marine drive unit.

SUMMARY OF THE INVENTION

The present invention comprises a torsional damper for connecting the engine crankshaft and the driveshaft in a marine drive unit utilizing a highly viscous fluid to provide both the driving medium and to absorb the torsional vibration. The damper includes a housing attached at one end to the engine crankshaft for rotation therewith and a first set of damper plates attached to the inside of the housing in a spaced parallel relationship along the common axis of the engine crankshaft and driveshaft. The first set of damper plates defines an axial opening disposed on the common crankshaft/driveshaft axis within which is disposed a driveshaft extension carrying a second set of damper plates also disposed in spaced parallel relationship along the common axis.

The damper plates of the first and second sets are interleaved in an alternating arrangement to substantially overlap one another and to lie in closely spaced parallel relation within the damper housing. The ends of the driveshaft extension are journaled within the housing for relative rotation therein and, therefore, the second set of damper plates is carried on the driveshaft extension for relative movement between and with respect to the adjacent interleaved plates of the first set. The housing is filled with a high viscosity fluid having a high resistance to shear, thereby substantially eliminating slip between the plate sets and, likewise, slip between the crankshaft and driveshaft. The viscosity fluid provides a medium to absorb the torsional vibrations ordinarily transferred from the crankshaft to the driveshaft without significant loss of driving efficiency.

DETAILED DESCRIPTION OF THE PREFERRED EMBODIMENTS

Figure 1:
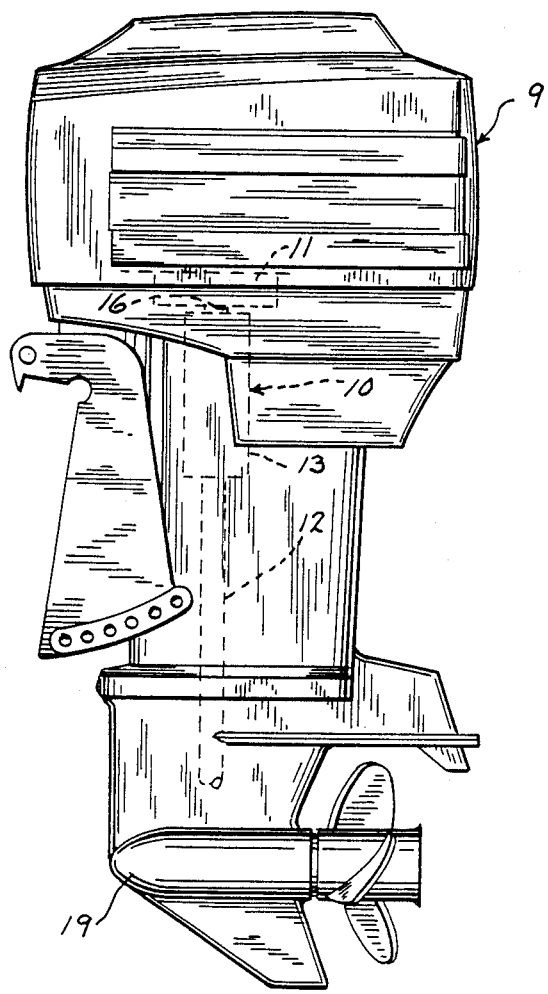
FIG. 1 is a side elevation view of a conventional outboard motor showing the relative position of a torsional damper of the present invention in the drive train.

A torsional damper 10 of the present invention comprises essentially a high viscosity fluid coupling interconnecting the engine crankshaft 11 and the driveshaft 12 of a marine drive unit. The marine drive unit may comprise either an outboard motor 9 or a stern drive, the embodiment of the damper 10 shown in FIG. 2 being particularly adapted for use in an outboard motor.

The torsional damper 10 includes a housing 13 which may be of generally cylindrical construction with the axis of the cylindrical wall 14 disposed on the common axis of the crankshaft and driveshaft. In conventional outboard motor construction, the lower end of the crankshaft 11 is provided with a splined downwardly facing axial opening 15 into which the outside splined upper end of the driveshaft is inserted for driving connection. The driveshaft, in turn, is normally assembled as a part of the lower gear case 19 from which the horizontal propeller shaft extends with the driveshaft extending upwardly from the gear case through a driveshaft housing to the splined slip fit into the crankshaft. Thus, the gear case via its attachment to the outboard motor housing members holds the driveshaft in engagement with the crankshaft, all in a manner well known in the art.

The damper 10 of the present invention provides a coupling and is interposed between the crankshaft and the driveshaft. Therefore, to accommodate conventional crankshaft construction, the damper housing 13 may include an integral upwardly extending axial stub shaft 16 which is similarly splined to fit into the splined opening 15 in the crankshaft to be drivingly engaged thereby.

The upper end of the driveshaft 12 is disposed within the damper housing 13 with the free upper end 17 of the driveshaft journaled in an upper bushing 18 which is secured in a recess 20 in the upper wall of the housing. The driveshaft is also journaled in a lower bushing and seal 21 which is attached to the lower wall 22 of the housing. The lower bushing and seal 21 may be attached to the lower wall of the housing in any convenient manner, such as by press fitting it into a cylindrical sleeve 23 formed as an integral part of the lower wall 22. Thus, the driveshaft is journaled for rotation within the housing 13, but relative rotation between the driveshaft and housing is substantially limited as will be hereinafter described.

Figure 3:
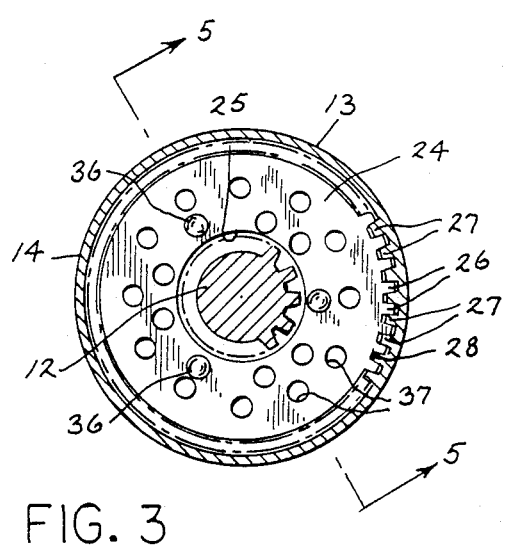
FIG. 3 is a sectional view taken on line 3—3 of FIG. 2 showing in plan view a damper plate of the type utilized in the first set.

A set of first damper plates 24 is attached to the interior of the cylindrical wall 14 of the housing for rotational movement therewith. The plates 24 are disposed in spaced parallel relationship along the common axis of the housing and the attached crankshaft and driveshaft. Referring also to FIG. 3, each first damper plate 24 comprises a thin circular disc, preferably made from hard steel. Each first plate 24 includes a central axial opening 25 having a diameter just slightly larger than the maximum outer diameter of the portion of the driveshaft 12 disposed within the housing 13. The peripheral edge of the first plate is provided with a series of uniform, equally spaced teeth 26 disposed around the entire circumference. The inner face of the cylindrical wall 14 of the housing 13 includes integral axially extending first splines 27 adapted to be received in notches 28 between the teeth 26 in the edge of the first damper plates 24. In this manner, the first damper plates 24 are keyed to the wall of the housing 13 for relative rotational movement therewith.

A set of second damper plates 30 is attached to the portion of the driveshaft 12 disposed within the housing 13 in a manner to rotate with the driveshaft relative to the housing and the first damper plates 24. The first and second damper plates are arranged in an alternating interleaved pattern such that their opposing surfaces substantially overlap one another in closely spaced parallel relation.

Figure 4:
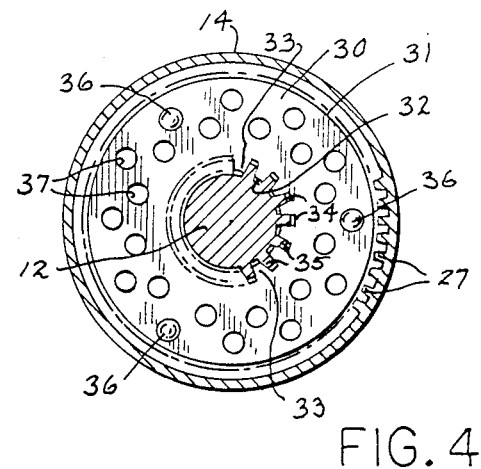
FIG. 4 is a sectional viw taken on line 4—4 of FIG. 2 showing in plan view a damper plate of the type used in the second set.
Figure 5:
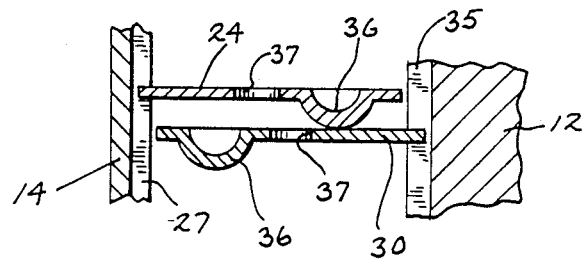
FIG. 5 is an enlarged partial sectional view taken on line 5—5 of FIG. 3.

Referring also to FIG. 4, each of the second damper plates 30 comprises a thin, hard, steel disc substantially similar to the first plate 24. The outer peripheral edge 31 of each second plate is smooth and continuous and defines a circle having a diameter just slightly less than the diameter of the circle defined by the crests of the first splines 27, such that there will be a clearance between the second plates 30 and the cylindrical wall 14 of the housing. Each second plate 30 includes an interior axial aperture 32 having a series of uniform and equally spaced second teeth 33 defining therebetween a series of second notches 34. The end of the driveshaft 12 within a housing 13 is provided with axially disposed second splines 35 which are sized to fit within the second notches 24 in the damper plates 30 such that the plates 30 are keyed to the driveshaft for rotation therewith.

The first and second damper plates 24 and 30 may be conveniently mounted in the damper assembly by alternately sliding them axially into the housing and around the driveshaft. The alternating stack of first and second damper plates must be maintained in relatively close uniform spacing of, for example, a few thousandths of an inch. To maintain uniform interplate spacing, each of the plates may be provided with a series of dimples 36 the apexes of which bear on the next adjacent plate to maintain the appropriate spacing. Each plate should preferably have 3 dimples 36 with the dimple patterns in the first and second plates shifted circumferentially, as during assembly or radially, as shown, to prevent coincidence between the dimples on adjacent plates. The upper and lowermost plates 24 or 30 in the assembled plate stack may bear against the ends of upper and lower bushings 18 or 21, respectively, to maintain the axial position of the plate stack.

The interior of the housing 13 in the assembled damper 10 is filled with an extremely high viscosity fluid which also fills the spaces between the plates 24 and 30 to provide a high resistance to shear and thus a high resistance to slippage between the plates as a result of the torque transmitted from the crankshaft to the driveshaft. The fluid preferably comprises an extremely high viscosity formulation of a silicone-based fluid sold under the trademark Dow-Corning 211. This fluid can be formulated with a viscosity of 300,000 centipoise which is approximately 20 times higher (numerically) than the fluids used in viscous couplings for automotive applications.

To enhance the resistance of the viscous fluid to shear and thus decrease the potential of the damper to slippage, each of the plates 24 and 30 is provided with a pattern of holes 37 through which the viscous torque transmitting fluid may pass. The contact between the fluid and the edge surfaces of the holes 37 provides substantial additional contact surface, resulting in the desired added resistence to fluid shear. It is desired that the damper construction substantially eliminate slip between the first and second plate sets and yet utilize the small amount of cushioning or elasticity in the high viscosity fluid to absorb torsional vibrations generated by peak engine firing impulses and prevent or substantially dampen transmission of those vibrations from the crankshaft to the driveshaft. The extremely high viscosity fluid used in the damper construction herein effectively causes the coupling to lock up under applied engine torque and essentially prevent slipping. The virtual elimination of slip also eliminates heat generated by such slip.

The high viscosity fluid described above is stable over a wide temperature range making it suitable for use in marine drive applications over the full range of temperatures they normally encounter.

Figure 6:
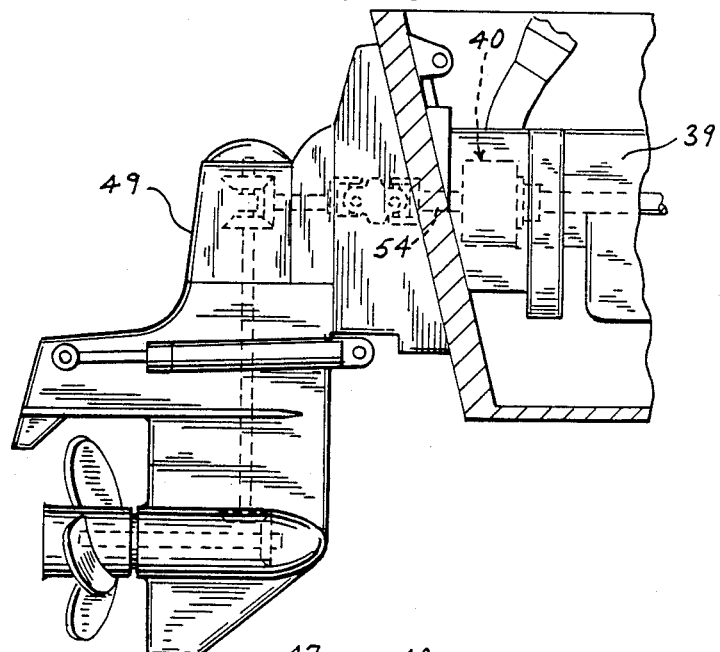
FIG. 6 is a side elevation view of a conventional marine stern drive apparatus showing the relative position of an alternate embodiment of the torsional damper in the drive train.
Figure 7:
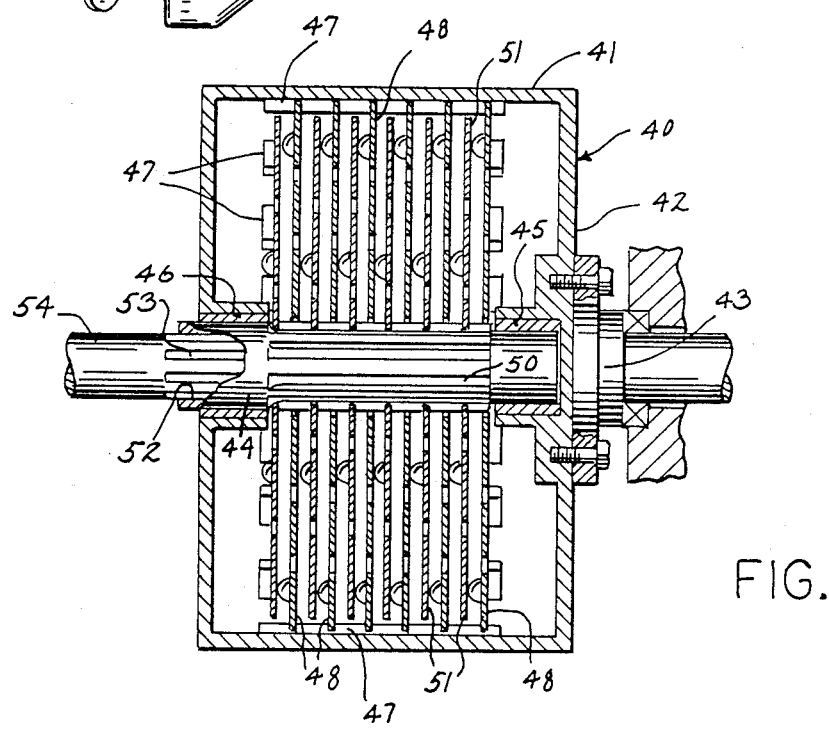
FIG. 7 is a vertical section through the alternate embodiment of the torsional damper shown in FIG. 6.

FIGS. 6 and 7 show a torsional damper 40 of an alternate embodiment which may be utilized in a stern drive application. A stern drive damper 40 includes a generally cylindrical housing 41 which is preferably of a substantially larger diameter, but also substantially narrower in an axial direction, than the housing of the FIG. 2 damper used in an outboard motor application. The housing 41 includes an end plate 42 which may be bolted directly to the crankshaft hub 43 of an inboard engine 39. A driveshaft extension 44 is journaled for rotation within the housing 41 in inner and outer bushings 45 and 46, respectively. Outer bushing 46 also includes an annular seal to retain the transmission fluid within the housing.

The interior cylindrical wall of the housing 41 includes first splines 47 adapted to be received in the peripheral notches in a set of first damper plates 48 which, except for size, may be essentially identical to the first damper plates 24 shown in FIG. 3. Similarly, the driveshaft extension 44 is provided with second splines 50 on its outer surface adapted to cooperate with the inner peripheral notches on a set of second damper plates 51 which may be essentially identical to the second damper plates 30 of FIG. 4, except for the larger size of plates 51.

Driveshaft extension 44 includes a splined ID portion 52 on the end extending axially out of the housing 41 which is adapted to receive the splined end 53 of an input driveshaft 54 to a conventional stern drive unit 49.

Figure 2:
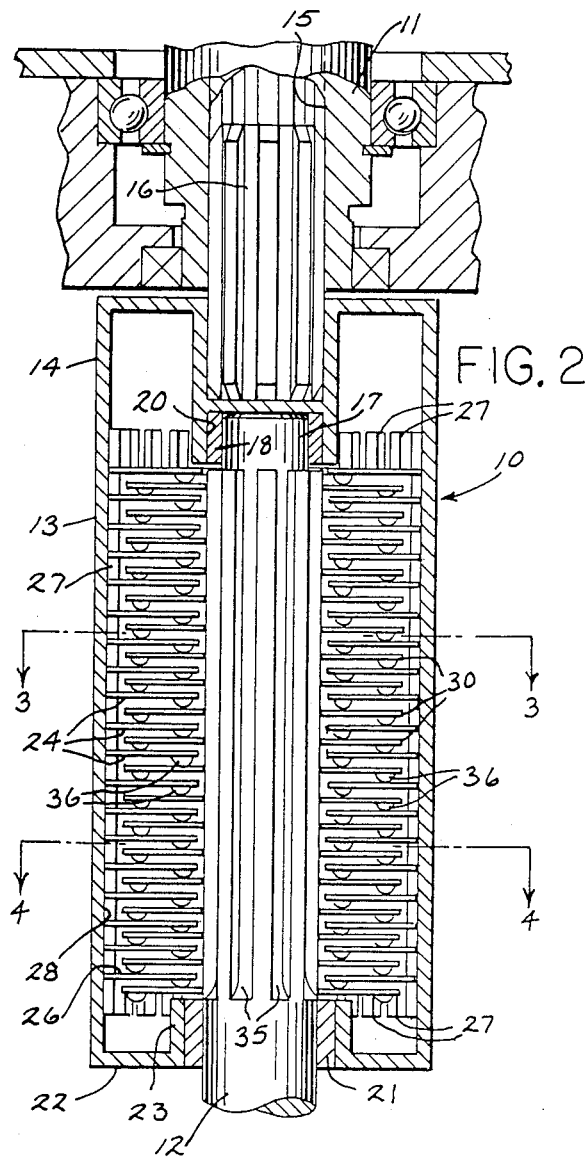
FIG. 2 is a vertical section through the torsional damper of the present invention showing a construction particularly adapted for use in an outboard motor.

The interior of the housing 41 is filled with a high viscosity fluid of the same type previously described with respect to the FIG. 2 embodiment and the stern drive damper 40 otherwise operates similarly to essentially eliminate slip between the crankshaft and the driveshaft extension, yet absorb and cushion the transmission of torsional vibrations from the engine to the drive unit. The FIG. 7 embodiment is designed to accommodate the conventional input driveshaft 54 having the splined end 53 as shown. In existing constructions, the splined end 53 is attached directly to correspondingly splined ID in the engine crankshaft.

A damper construction utilizing a driveshaft extension similar to the extension 44 shown in FIG. 7 may also be utilized in an outboard motor application. Such a driveshaft extension would be used instead of extending a more conventional driveshaft 12 from the lower gear case 19 into the damper housing 13, as shown in FIGS. 1 and 2. In such a construction, the main driveshaft 12 would, of course, be substantially shortened and include a splined upper end to engage a splined fitting in the end of the driveshaft extension. It is also possible to reverse the connection of the device such that the housing 41 is attached to the driveshaft and the shaft extension is attached to the crankshaft. The overall diameter of the housing 13 of a damper 10, when utilized in an outboard motor application, can be kept small enough to allow it to fit within the size ranges generally utilized for driveshaft housings. Obviously, the diameter of the unit and thus the diameters of the damper plates, as well as the axial length of the damper and thus the number of plates, depend on the torque transmission requirements, the amount of allowable slip, and the viscosity of the fluid used.

I claim:

1. In a marine drive unit including an engine having a crankshaft and a driveshaft disposed in axial alignment with, operatively connected to and driven by the crankshaft, a viscous torsional damper for directly connecting the engine crankshaft and the driveshaft comprising:

a damper housing having means at one end for attachment to one of the crankshaft and the driveshaft for rotation therewith;

a first set of damper plates attached to the inside of the housing for rotation therewith and disposed in spaced parallel relationship along the common axis of the crankshaft and driveshaft;

each of said first set of plates having a center opening defining an axial opening extending through the set on said common axis;

a driveshaft extension disposed within said axial opening and journalled for rotation relative to said housing on said common axis;

a second set of damper plates attached to said driveshaft extension for relative rotation therewith and disposed in spaced parallel relationship along said common axis;

the plates of said first and second sets interleaved and substantially overlapping one another in closely spaced parallel relation; and a high viscosity fluid substantially filling said housing and in contact with said plates to absorb torsional vibrations transmitted by the engine, the viscosity of said fluid being high enough to substantially prevent fluid shear and slip between said plate sets at full engine operating power.

2. The invention of claim 1 wherein said fluid has a viscosity of approximately 300,000 centipoise.

3. The invention of claim 1 including means for attaching the axially outer end of said driveshaft extension to the other of the crankshaft and the driveshaft.

4. The invention of claim 3 wherein said housing is attached to the crankshaft.

5. The invention of claim 4 wherein said driveshaft extension comprises an integral part of the driveshaft.

6. The invention of claim 1 including spacer means for maintaining a substantially equal spacing between adjacent plates.

7. The invention of claim 6 wherein said spacer means comprises dimples in the plate surfaces, the apexes of said dimples adapted to engage and bear against the surface of an adjacent plate.

8. The invention of claim 1 wherein said plates are perforated.

9. The invention of claim 1 wherein said damper housing comprises a cylindrical inner wall concentric with said common axis, said inner wall having a series of axially disposed first splines thereon, and wherein each of said first set of plates includes first notches in its peripheral edge corresponding in size and shape to said first splines and adapted to receive said first splines therein.

10. The invention of claim 9 wherein said driveshaft extension includes axially disposed second splines on the outer surface thereof, and wherein each of said second set of plates includes an interior axially disposed aperture having second notches in the edge thereof corresponding in size and shape to said second splines and adapted to receive said second splines therein.

11. The invention of claim 10 including closure means on the other end of said housing for mounting said sealing means and for maintaining the position of the first and second sets of plates within the housing.

* * * * *